United States Patent [19]
Chai

[11] 3,792,197
[45] Feb. 12, 1974

[54] SOLID-STATE DIODE ARRAY CAMERA TUBE HAVING ELECTRONIC CONTROL OF LIGHT SENSITIVITY

[75] Inventor: Sooyoung Chai, Madison Township, Middlesex, N.J.

[73] Assignee: Bell Telephone Laboratories Incorporated, Murray Hill, N.J.

[22] Filed: July 31, 1972

[21] Appl. No.: 276,291

[52] U.S. Cl. .................................................. 178/7.1
[51] Int. Cl. .................................................. H04n 5/30
[58] Field of Search ............... 178/7.2, 7.1, DIG. 29; 317/235/27.1; 313/89

[56] References Cited

UNITED STATES PATENTS

| | | | |
|---|---|---|---|
| 3,576,392 | 4/1971 | Hofstein | 178/7.1 |
| 3,403,284 | 9/1968 | Buck | 178/7.2 |
| 3,440,477 | 4/1969 | Crowell | 317/235 |
| 3,419,746 | 12/1968 | Crowell | 317/235 |
| 3,634,692 | 1/1972 | Padovani | 317/235 |

*Primary Examiner*—Richard Murray
*Attorney, Agent, or Firm*—D. L. Hurewitz

[57] ABSTRACT

A silicon diode array target structure is disclosed in which light sensitivity is electronically controlled. Photons incident upon a target generate hole (minority carrier) electron pairs. A single large area reversed bias P-N junction structure is formed over the entire image area on the light incident side of a conventional diode array target, and the depletion region created by the reverse bias both controls light sensitivity by impeding the movement of minority carriers toward the diode array target and serves as a sink for the minority carriers generated within the depletion region.

6 Claims, 2 Drawing Figures

SOLID-STATE DIODE ARRAY CAMERA TUBE HAVING ELECTRONIC CONTROL OF LIGHT SENSITIVITY

BACKGROUND OF THE INVENTION

In recent years, a camera tube using a silicon diode array target has been developed for special television applications, such as the PICTUREPHONE visual telephone. This target consists of a planar array of approximately one-half million diodes made conventionally by diffusion of P impurity-type material, such as boron into the N impurity-type silicon substrate. In operation the diode array surface of the target is scanned by a low energy electron beam which in conjunction with an applied target voltage causes the array to be reverse biased. In addition, the electron beam stabilizes the array surface at cathode potential, and a thin resistive film, known as a resistive sea, which is evaporated over the array, prevents charging below cathode potential. Light from the scene is incident upon the N-type material at the surface opposite the diode array and the light energy generates electron-hole pairs within the bulk substrate. The minority carriers (holes) diffuse through the substrate and are collected by the reverse biased diode array, and a video signal proportional to the number of holes collected is produced in a well-known manner. A very thin layer of $N^+$ material is normally formed over the light incident surface of the target by diffusion of a material such as phosphorous. This provides a reduction of surface recombinations and hence enhances the collection efficiency of the photon-excited holes, particularly at the short wavelength end of the visual spectrum.

Unlike the antimony trisulphide vidicons, the silicon type targets lack a means of electronic control of light sensitivity. In order to obtain this electronic light or iris control a technique which has recently been reported incorporates an auxiliary electrode structure in the diode array. This structure, described in "A Silicon Diode Array Camera Tube With Electronically Controllable Responsivity" by E. H. Stupp, B. Singer, J. Kostelec, W. Steneck and M. H. Crowell, 1972 *IEEE International Convention Digest*, March 20–23, 1972, at pages 290–291, involves the addition of specialized gate diodes in the diode array. Under bias control these gate diodes attract holes to a sink so that the holes attracted to the video sensing diodes can be restricted, thereby controlling the light sensitivity of the target.

Another method has also been suggested which utilizes a large area MOS capacitor formed on the light incident surface of the silicon target. This arrangement is disclosed by S. Hofstein in U.S. Pat. No. 3,576,392, issued Apr. 27, 1971. The incident surface of the N-type silicon substrate is covered by a thin insulating layer of oxide and a metal plate is applied over the insulator. This forms a large area metal oxide semiconductor (MOS) capacitor over the entire imaging area. The capacitor is biased to create a depletion region in the substrate as a result of the charge distribution on the capacitor. The resultant depletion region prevents diffusion of the photon-excited holes toward the array, and the holes are removed by a specially formed collecting diode applied to the light incident surface outside the imaging area. The control of the capacitor bias voltage varies the depletion region width and hence the target's light sensitivity.

SUMMARY OF THE INVENTION

The present invention provides an alternative technique for electronic light control in a diode array target. It utilizes a simpler and less costly structure than that disclosed by Hofstein to produce a controllably variable width of a depletion region at the light incident surface of the target.

In accordance with the invention a shallow layer of one impurity-type semiconductor material is diffused into the light incident surface of the other impurity-type substrate. This forms a P-N junction which when reverse biased by an external source creates a depletion region having a width modulated by the magnitude of the applied bias voltage. Photon-excited holes are generated in a conventional manner but those generated within the depletion region appear as a current in the control bias circuit and do not reach the diode array. As these holes have been removed, they do not contribute to the video current and thus control of the depletion region width by means of the bias adjustment restricts the number of holes contributing to the video output.

The structure of the present invention performs a similar function to that of the Hofstein capacitor arrangement, but it requires only a single diffused layer of opposite impurity-type material to form the one large junction. This is in distinction to the more complicated and expensive process required by the capacitive technique which involves the multistep applications of an insulator and metal layer to form a capacitor and the creation of an additional collection diode on the light incident surface.

DETAILED DESCRIPTION

Figure 1:
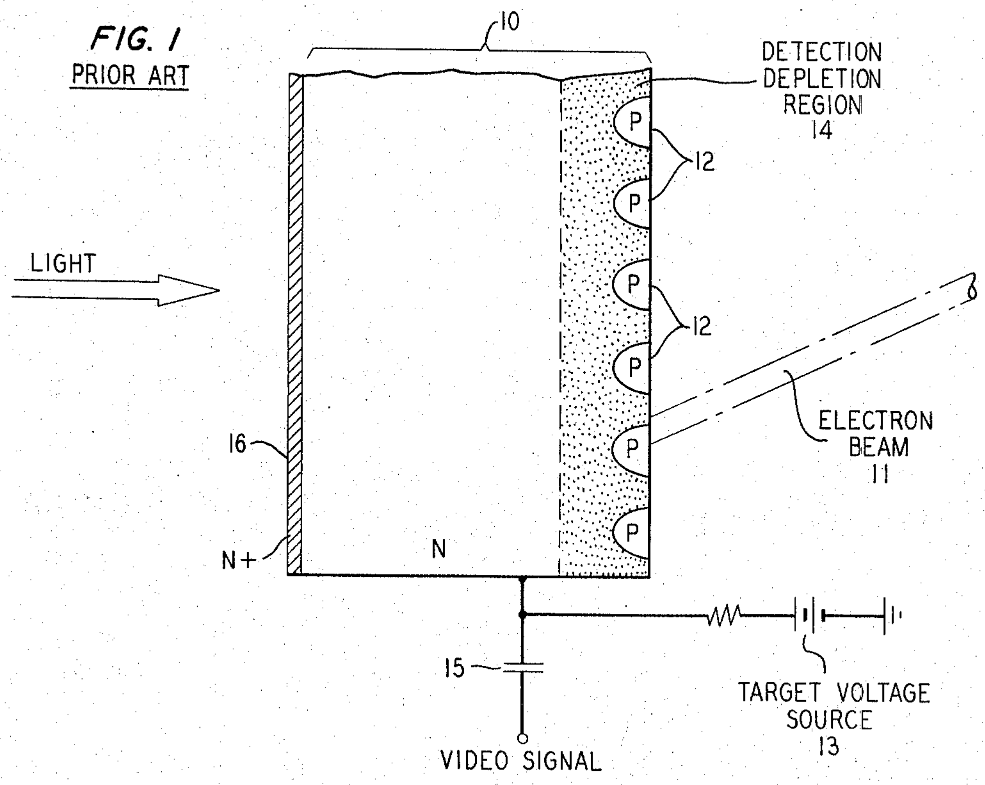
FIG. 1 PRIOR ART
FIG. 1 is a schematic diagram representing a standard diode array target.

FIG. 1 illustrates a conventional solid-state diode array target in which the bulk material 10 is N-type silicon. Electron beam 11 scans an array of diodes 12, completing a bias path including the target voltage source 13 to provide reverse bias of the diodes 12, and the resultant electric field forms a detection depletion region 14 in the vicinity of the array. Minority carriers (holes) generated by the light incident on the opposite side of substrate 10 diffuse across the bulk N-type material 10 and are swept by the reverse biased field in region 14 toward the diode array. The successive scanning of the array by beam 11 will continuously recharge the bias field, yielding a current in the target bias circuit which is proportional to the holes generated by the incident light. This current is ac coupled by capacitor 15 out of the bias circuit to produce a video signal.

A diffused thin layer 16 of $N^+$ material is located on the light incident side of substrate 10. This reduces the recombination of holes at the incident surface and hence improves the sensitivity of the tube to low wavelength light since photons at this wavelength penetrate the silicon less deeply than do the photons at higher wavelengths.

Figure 2:
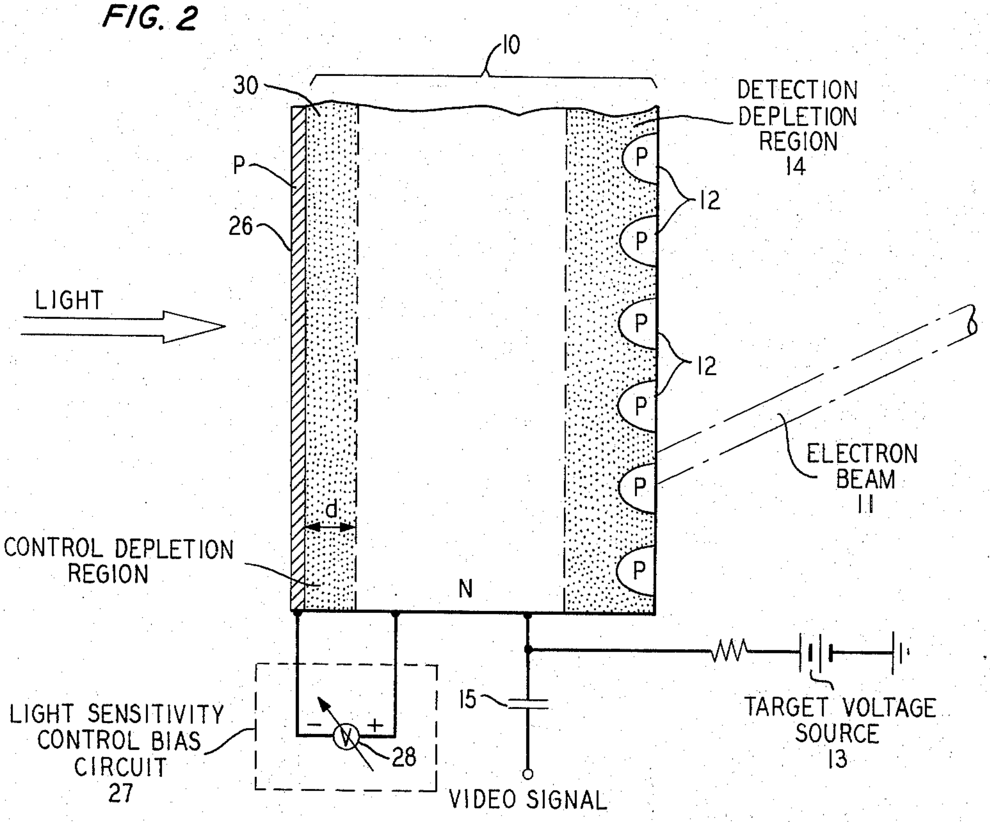
FIG. 2 is a representation of the target structure having electronically controllable light sensitivity in accordance with the present invention.

A target structure having electronic control of light sensitivity is shown in FIG. 2. As in the structure of FIG. 1, it includes an array of diodes 12 scanned by an electron beam 11 and biased by the operation of the electron beam and the target voltage source 13 to form detection depletion region 14, and the target operates to produce the ac coupled video signal in the standard manner.

Light sensitivity control is provided by diffusing on bulk material 10 a shallow layer 26 of P-type material to form a large area uniform P-N junction. This P-type layer 26 which is on the order of a tenth of a micron thick may be formed by conventional diffusion of a material such as boron but alternatively sputtering a metal layer on substrate 10 would produce a Schottky barrier type diode junction suitable for the invention. In addition to reducing surface recombinations as does the $N^+$ layer in the target of FIG. 1, the P-N junction between layer 26 and substrate 10 produces a control depletion region 30 when the junction is reverse biased. Light sensitivity control bias circuit 27 provides the required bias by connecting the negative side of variable dc potential source 28 to layer 26 and the positive side to substrate 10.

The single large area P-N junction covers the entire imaging area of the light incident surface so that all incident photons enter the control depletion region 30. Holes generated within region 30 by the action of the photons are, however, prevented from reaching the target diode array because the electric field existing within the region tends to sweep them into the P layer 26. These holes thus appear as a photo-current in sensitivity control bias circuit 27. The control depletion region 30 thus can be considered as a dead layer or sink for the holes generated within it since they cannot contribute to the video signal.

Depending upon the wavelength of the incident light and the dead layer thickness, some portion of the incident light is effectively absorbed in this depletion region. As the width, $d$, of region 30 is increased, the number of photon-excited holes reaching the diodes 12 and hence contributing to the video current is reduced in the same way as if a mechanical iris had been used to reduce the amount of light incident upon the target. It is well known for example that for a step junction:

$$d = k\sqrt{V} \quad (1)$$

where $k$ is a constant and $V$ is the sensitivity source voltage, and hence the width, $d$, is directly controlled by varying, manually or otherwise, the voltage produced by source 28.

For monochrome television applications, the variation of source voltage will simply control the video current but because the photon absorption coefficient of silicon is a function of the wavelength of the incident light, the spectral response of the tube is affected by the sensitivity control. The low wavelength light at the blue end of the spectrum will penetrate less deeply than the higher wavelengths and increased depletion widths will accordingly reduce the target sensitivity to these low wavelengths to a greater extent than it affects the sensitivity to light at the higher end of the spectrum. Thus, decreased light sensitivity tends to cut off the target's sensitivity to the lower wavelengths of the spectrum.

In all cases it is to be understood that the above-described arrangements are merely illustrative of a small number of the many possible applications of the principles of the invention. In particular, though the target structure has been discussed in terms of an N-type substrate, it is possible to utilize a P-type bulk material in which case the roles of P- and N-type materials would be reversed. The appropriate modification of the biasing circuits as well as numerous and varied other arrangements of the target structure may readily be devised by those skilled in the art without departing from the spirit and scope of the invention.

What is claimed is:

1. An optical image conversion device comprising a semiconductor substrate of one impurity type having an array of discrete regions of the other impurity type forming an array of semiconductor detecting junctions on one surface of the substrate, said junctions being arranged to collect photon-generated minority carriers produced by light incident upon the surface of the substrate opposite said one surface, a single thin layer of material being disposed uniformly upon said opposite surface of the substrate to form a single large area uniform semiconductor junction adjacent the portion of said opposite surface upon which the light is incident, and means for reverse biasing the large area uniform junction, said bias means being variable to control the width of the depletion layer formed by the uniform junction so that the variation of the width of said depletion layer controls light sensitivity, the layer acting as a sink for minority carriers generated by photons in the depletion region.

2. An optical image conversion device as claimed in claim 1 wherein the material forming the thin layer is a semiconductor material of the other impurity type.

3. An optical image conversion device as claimed in claim 2 wherein said substrate is an N-type material, and said large area uniform junction is formed by diffusing a thin layer of P-type material upon the N-type substrate.

4. An optical image conversion device as claimed in claim 1 wherein said large area uniform junction is formed by sputtering a metal upon the substrate to form a Schottky barrier type diode junction.

5. An optical image conversion device as claimed in claim 1 wherein the width of the depletion layer is varied by varying the bias voltage applied to the large area uniform junction, with the means for reverse biasing having only two electrical connections to the target.

6. In a solid-state video camera target system of the type comprising a bulk semiconductor material having a light incident surface, a portion of the incident surface being an imaging area upon which light from a scene is incident, a diode array arranged on a surface of the bulk material opposite the light incident surface, means including a scanning electron beam for biasing the diode array such that minority carriers generated in the substrate by the incident light are attracted toward the diode array and for removing from said target a video current proportional to the number of attracted carriers, and means for controlling the number of carriers attracted to the diode array characterized in that, said means for controlling includes a single thin layer of material on the light incident side of the target, said layer forming a single large area semiconductor junction formed over the entire imaging area, means for reverse biasing said junction to produce a depletion region in the bulk material adjacent to said large area junction, and means for varying the reverse bias voltage to vary the width of the depletion region so that varying the width of said depletion region controls light sensitivity, the layer acting as a sink for minority carriers generated by photons incident in the depletion region.

* * * * *